(12) United States Patent
Lee (10) Patent No.: US 7,644,509 B2
(45) Date of Patent: Jan. 12, 2010

(54) GROUP CUTTING SLEEVE AND METHOD

(76) Inventor: Han-Sen Lee, 98-1, Show-Tsuo St. Show-Tsuo Village, Fu-Hsing Hsiang, Chang-Hwa Hsien (TW)

( * ) Notice: Subject to any disclaimer, the term of this patent is extended or adjusted under 35 U.S.C. 154(b) by 265 days.

(21) Appl. No.: 11/656,756

(22) Filed: Jan. 22, 2007

(65) Prior Publication Data

US 2008/0173149 A1    Jul. 24, 2008

(51) Int. Cl.
*B26D 7/01* (2006.01)
(52) U.S. Cl. .......................................... 33/573; 83/466.1
(58) Field of Classification Search ................... 33/573, 33/562, 566, 1 F, 613, 645; 83/466.1, 29, 83/452; 269/37, 40, 43, 44
See application file for complete search history.

(56) References Cited

U.S. PATENT DOCUMENTS

| | | | | | |
|---|---|---|---|---|---|
| 1,468,705 | A | * | 9/1923 | Hand et al. | 269/54.2 |
| 2,567,586 | A | * | 9/1951 | Werder | 33/562 |
| 2,751,946 | A | * | 6/1956 | Gramelspacher | 144/350 |
| 3,675,299 | A | * | 7/1972 | Sherrill, Jr. | 269/40 |
| 4,650,379 | A | * | 3/1987 | Jaskolski | 409/220 |
| 5,595,102 | A | * | 1/1997 | O'Grady | 83/435.17 |
| 5,822,942 | A | * | 10/1998 | Lucia, Jr. | 52/514 |
| 6,100,942 | A | * | 8/2000 | Hollenbaugh et al. | 348/836 |
| 6,167,680 | B1 | * | 1/2001 | Horn | 53/473 |
| 6,385,859 | B1 | * | 5/2002 | Varney | 33/613 |
| 6,742,432 | B1 | * | 6/2004 | Langis | 83/745 |
| 7,360,476 | B2 | * | 4/2008 | Berthiaume | 83/467.1 |
| 2004/0231178 | A1 | * | 11/2004 | Collins | 33/613 |

* cited by examiner

*Primary Examiner*—Christopher W Fulton
(74) *Attorney, Agent, or Firm*—Curtis L. Harrington; Kathy E. Harrington; Harrington & Harrington (57) ABSTRACT

A structure and process for producing an even cut for window covering horizontal slat sets includes a cutting sleeve attached at opposite ends of the slats of a window covering horizontal slat set to be cut which gather in selective ones of the slates together for cutting in a way which minimizes collective bowing and ripping of the finished surface immediately adjacent the cut ends of the slats. The cutting sleeves can be spaced to hold groupings of 1, 2, 3, 4, 5, 6, 7, or more slats. Embodiments of the cutting sleeves can have two main opposite walls or eliminate one wall in favor of a comb topography which can load from the side.

21 Claims, 3 Drawing Sheets

GROUP CUTTING SLEEVE AND METHOD

FIELD OF THE INVENTION

The present invention relates to a method of insuring a proper cut for horizontal slat window coverings which combats the ripping effect resulting from cutting the slats in simple compression by providing a cutting sleeve which is preferably cut at the time of cutting of the slats and which highly supports the area of the slats being cut.

BACKGROUND OF THE INVENTION

Some window covering horizontal slat sets are provided in standard widths and are provided such that customers can have the ends trimmed to a smaller size to make a custom fit within a window opening. This system enables the manufacturers to provide a smaller number of standard sizes, along with the provision that six to eight inches can be trimmed from the outer dimensions of the slats, the portion extending beyond the lift cords.

Typically a purchaser will have the seller perform two cuts at the time of sale to keep bilateral symmetry of the window covering horizontal slat sets. The majority of the window covering horizontal slat sets which are provided for cutting have base slats, regular slats and head rail members which extend laterally beyond the lift cords as constant cross sectional members and which have the ability to be cut with even force. If the material of the base slat and head slat presented different cutting softness, and uneven cut would occur. Further, during the cutting process, the window covering horizontal slat sets are supported in a compacted position with the head rail and base slat brought together and collectively orienting the intermediate slats together to enable them to be cut simultaneously.

The cutting devices provided at the point of sale are typically circular saws mounted on a miter-box arrangement and are typically used for making other types of cuts to a wide variety of other products. The blades are typically carbide tipped for long wear and are expensive to replace, especially since the cutting expenses are cost centers, typically with no charge being made to cut purchased product. Many retailers do not change the blades often, the objective being to have a blade continue in service until it is so worn that cutting becomes difficult.

Even when the blades are perfectly new and in 100% proper working order, the cut produced is almost never a clean cut. Any cutting motion which has an angle which produces a force component normal and leading away from a main surface of the slat had a tendency to produce a slight rip of the material on the main surface of the slat if the compression of the main surface is not maintained.

This surface end "rip" does not always become apparent when the window covering horizontal slat sets are cut in their compressed state, re-boxed and handed to the customer. The customer typically only detects any ripped surface at the time the window covering horizontal slat sets are installed, and usually after significant work in mounting the support brackets closely within a window opening and mounting the window covering horizontal slat set within the support bracket and testing the installed window covering. The ripped surfaces are most pronounced when the slats are tilted and depending upon which main surface the blade departed.

As before, the newer the blade, the fewer the ripped surface interruptions. It is impractical to use a new blade for each window covering horizontal slat set to be cut, and even if this were done, the ripped surfaces would not be eliminated. The negative aspects of the creation of ripped surfaces increase as the slat covering is colored differently than the material from which the slat is made. The more severe the color difference, the more noticeable the ripped surface.

The imperfections which occur during cutting are even more disappointing for the customer as the product is usually not returnable once it has been cut to the user's specific dimensions. Re processing to "touch up" the rips or jagged surface interruptions would require the use of a paint or surface material which matches the paint or surface material on the slat. This is very impractical and costly and would erase the savings which occurred from the use of a window covering horizontal slat set which was both engineered for and amenable to cutting.

The problem of ripping is created due to a number of effects. A first effect could lie in the limitations of the cutting system of the retail outlet (which can vary widely). As before, the blade might form a cutting angle which was given to higher ripping rates. The cutting table might not have a good structure to compress the slats of the window covering horizontal slat sets. However, even where a good compressive structure is available, the compression of the complete window covering horizontal slat set, including head rail, base rail and slats, will invariable result in some ripping.

This second effect is due to the use of a ladder tape or ladder rope which is generally a series of vertical cords joined by thinner cords to form a support for the slats. Movement of the vertical cords slightly upward or downward with respect to each other is what causes the window covering horizontal slats to achieve an angle together. The main vertical cords lie outside the slats and when the slats are drawn together by pulling the main ladder cord, they cause no impediment to close fitting of the adjacent slats, even if a good cutting support for the window covering horizontal slat sets are available. The thinner cords which form slat supports extend between each of the slats adjacent the lift cord.

Although the cords which join the first and second vertical ladder cords is quite thin, having one extend between each slat in the set adds significant spreading distance and impedes the slats from close contact at their ends, where the cutting occurs. Further, cutting tables are configured to compress the whole window covering horizontal slat sets from top to bottom and do not provide additional force at the ends immediately at the areas which are to be cut. Any such system might also cause the slats to be cut unevenly where the top slat is swept down and the bottom slat is swept upwardly.

Other structures can interfere with the cutting step including kinked lift cords or portions of the two main vertical ladder cords which inadvertently slip in-between any two adjacent slats. Further, any holding device which is capable of high compression of the window covering horizontal slat sets, particularly at the ends will have a high probability of damaging the head rail. The head rail typically has thin vertical walls and cannot withstand significant compression vertically. Where the head rail material is made of plastic, polyurethane, polyvinyl chloride, nylon, fiber glass, metal, glass, carbon composite, polypropylene, Teflon or other soft material amenable to cutting, over-compression could cause head-rail damage.

Applying pressure selectively to the slats near their tip ends would create a general bowing effects where the top and bottom slats would be shorter than the slats in the middle, and would create rips in the slats as the pressure on each slat was selectively cut and released as it was cut. Applying anything to the slats which could pull off the paint is also not advisable and could pose a safety hazard and perhaps damage the window covering horizontal slat set.

What is needed is a device and method to prevent rips which occur during cutting. The device should enable control and a high degree of cutting consistency regardless of the cutting system employed, and even where a cutting blade is near the end of its service life and has high blade wear. The needed device and method should be utilizable easily, both by factory producers, retail outlets who typically perform the cutting, and by users who elect to cut the window covering horizontal slat sets at home, at the time of installation.

The needed device and method should produce an even cut, and will avoid harsh and excessive application of force to the ends of the slats. The ideal device and method should not only be amenable for introduction at the manufacturing plant, but also be amenable for use on window covering horizontal slat sets produced by others by either the retail outlets or by users at the time of cutting of their window covering horizontal slat sets for home installation.

SUMMARY OF THE INVENTION

The structures and process for producing an even cut for window covering horizontal slat sets is a cutting sleeve attached at opposite ends of the slats to be cut which gather in selective ones of the slates together for cutting in a way which minimizes collective bowing. A device which tightly grasps collected small multiples of the slats can overcome the effects from the horizontal ladder cords which extend between individual slats. By pushing together small groupings, the combined effects of the ladder cord separation are numerically mitigated and isolated. By causing small groupings to come together, only the contribution of "n−1" horizontal strings have to be overcome in the grouping. For example, where the slats are collected in groups of four, the effects of only three between-slat thin horizontal ladder strings have to be overcome. The use of a cutting sleeve in accord with the description herein yields several advantages.

First, regardless of the influence of the horizontal ladder cords between the slats, the cutting sleeve will not only gather the slats, but support them through a channel in the cutting sleeve a compressed and parallel fashion. Because the groupings are small, the resistance effect from the horizontal ladder cords in having the cutting sleeve approach the ladder cords is slight and only pronounced once the sleeve approaches the ladder cords in the last few centimeters.

Second, because the slats are grouped and slightly separated, a slightly lesser cutting density is presented to the saw.

Third, the necessity to highly compress the window covering horizontal slat sets is eliminated. Because of the fact that the slats are supported with respect to each other and with respect to the cutting sleeve, the slats within the cutting sleeve will have even higher stability than either the base slat or the head rail.

Fourth, because the cutting sleeve is attached to the ends of the slats and can be slid toward the ladder cord portion of the horizontal slats.

Fifth, where the cutting sleeve is made from cuttable material matching the softness of the slats, the cutting sleeve can bear a cutting line which will enable the person performing the cutting to both cut the cutting sleeve down the middle so that both sides of the collected group are cut together and to give a more precise visual identification of the line to be cut. The latter is especially true where it is desired not to mark on the window covering horizontal slat sets or where a mark might be placed in a place which becomes inconvenient to see during cutting.

Sixth, the cutting sleeve facilitates the more exact placement of the cut, particularly where the cutting sleeve has a cutting line of predetermined length from its outer edges. In a case where the cutting sleeve is two inches wide with a central cutting line, and where the user desires to cut three inches from each end, the outer edge of the cutting sleeve can be moved exactly two inches from the end of the evenly collected slat sets and all the user need do is cut on the center cutting line of the adjusted cutting sleeve.

Seventh, because the cutting sleeve can be constructed to support groupings of 1, 2, 3, 4, 5, 6, slats, the cutting sleeve can be used with window covering horizontal slat sets having horizontal ladder cords of significant thickness. As the number of groupings within each channel of the cutting sleeve is reduced, the density of the slats being cut is reduced, with the total density based more upon the combination of softness of the material in the cutting sleeve and softness of material of the slats.

Eighth, where the cutting sleeve is made from cuttable material, one of the major stresses on the slats is eliminated, which is the ability for the last portion of slat being cut to either be ripped by the force of the blade or to participate in the ripping process due to lack of support which would otherwise come from support being had with respect to the slat portions being cut away. Put another way, when the last bit of a single slat, on the other side of the blade is present, the blade may act to push that last bit and its web to tear it away from the slat being cut rather than to cut the last bit of web away. The cutting away of the last bit of web between the slat portions to be cut will occur if both sides are supported. Because the sleeve envelops the slat groupings completely external to the slat groupings, where the cutting sleeve is being cut, it will always be the last piece of material which could potentially be unsupported to fall away from the blade. In most cases, however the other side of the slats to be cut will be generally supported. In any event, the last web portion, where a cutting sleeve will be cut along with the slats, will be cut rather than ripped.

Ninth, as a disposable item carried by retail stores, the cutting sleeves can be made of long channel length with a series of cutting lines such that it can be used and cut several times. As a non-disposable guide, and this is the least recommended use, a cutting guide providing slat groupings could be used to cut outside of the guide, even though this is not recommended practice for maximum prevention of ripping. Ripping from a worn blade might have a probability of occurring anywhere that the slat is not supported against movement of the blade. Best results would dictate that the guide be placed close to the line of cutting and might run the risk of inadvertently having the blade contact the non-cuttable guide.

Tenth, and especially as provided at the manufacturing site, the cutting sleeve is of sufficient utility and low cost that it can be provided directly onto the window covering horizontal slat sets as they are packed for shipment at the factory. Further, pre fitting of the cutting sleeve onto the slats will further help to protect the slats during shipment, as well as provide an attached cutting guide for use at the retail facility.

The materials of choice for the cutting sleeve are more varied than the materials which can be selected and used for slats. The cutting sleeve may be made from plastic, polyurethane, polyvinyl chloride, nylon, fiber glass, wood, glass, carbon composite, polypropylene, Teflon, shrink wrap, elastic, paper, cardboard, or metal. The cutting sleeve will ideally resemble a multi-celled structure and may be advantageously plastic injection molded. It will have cellular symmetry and may have other internal and external features which may be particular to the loading on process, the cutting process and the slidable adjustment process.

The cutting sleeve may include a slot or a series of apertures so that the user can verify that all of the slats are loaded fully into the cells so that any manual loading can occur without inadvertently under loading any given cell. One side of the cutting sleeve may have a brief taper to facilitate manual loading onto the ends of slats. The internals of the cells may have raised ribs to limit the frictional interaction between the cutting sleeve and the ends of the slats, to enable the cutting sleeve to move more easily along the grouped slats with no diminution in holding pressure.

The cutting sleeve can be made for end loading using channels having a completely cylindrically enclosed area, or which have one open side to form a comb topology which can be inserted into grouped slats laterally for speed of loading. The cutting sleeve can be made of a size to accommodate 1, 2, 3, 4, 5, 6, 7, or more slats in a group.

BRIEF DESCRIPTION OF THE DRAWINGS

The invention, its configuration, construction, and operation will be best further described in the following detailed description, taken in conjunction with the accompanying drawings in which.

DETAILED DESCRIPTION OF THE PREFERRED EMBODIMENT

The description and operation of the cutting sleeve of the invention is best begun to be described with reference to FIG. 1 which illustrates a plan view of a cutting sleeve 11 looking into the cells or chambers. A first planar wall 13 is seen opposite a second planar wall 15, and connected by a series of walls 17 forming a series of chambers 19. The walls 17 are arranged as connected walls extending between the first and second planar walls 13 and 15. As shown, the walls 17 each form at least part of a chamber 19, but this need not be the case. A connecting wall or walls or other structure can stabilize the first and second planar walls 13 and 15, with other structures utilized to make the individual structures used for gathering and stabilizing any slats to be engaged by the cutting sleeve 17. The first and second planar walls 15 and 17 extend beyond the rightmost wall to form a pair of base slat accommodation flanges 21.

The extension of the first and second planar walls 15 and 17 beyond the rightmost wall to form a pair of base slat accommodation flanges 21 is an optional feature which enables several advantages. Since a base slat (not seen in FIG. 1) will be the same width as the slats which will occupy the chambers 19, the provision of base slat accommodation flanges 21 will enhance the stabilization of the base slat (not seen in FIG. 1), as it is being cut. The slat accommodation flanges 21 and the adjacent walls 17 form a three sided accommodation space which helps to eliminate any need to compress the base slat with respect to a window covering set being cut, yet provide some stabilization for the relatively thicker base slat and help guard against any ripping of the base slat.

In one of the chambers 19 near the middle of the cutting sleeve 11 a series of four slats 23 are shown in their supported position. The slats 23 have main surfaces which oppose each other, with the two outside slats 23 abutting the walls 17. As can be seen, the slats 23 are tightly packed within the chambers 19.

If the cutting sleeve 11 is employed in working position, all of the chambers 19 would be filled with snugly supported slats 23, and a base slat (not shown in FIG. 1) would be accommodated within the space created by optional base slat accommodation flanges 21 and the adjacent walls 17. The loading process, if done manually, would involve a worker lying the cutting sleeve 11 next to a window covering horizontal slat sets (not shown in FIG. 1) in a compressed condition. Whether at the factory or the retail store, the worker grasps sets of four slats and begins to fill the chambers 19.

The slats 23 in a window covering horizontal slat set can generally be moved freely about, both laterally and longitudinally. It is therefore an easy matter for a worker to grasp the ends of four slats 23, push them partially within the first of the chambers 19, then grasp the next four adjacent slats 23 and begin feeding them into the next chamber 19 of the rigid cutting sleeve 11. The cutting sleeve 11 may terminate at the end of the wall 17 adjacent the slat accommodation flanges 21, thus eliminating the slat accommodation flanges 21.

Figure 1:
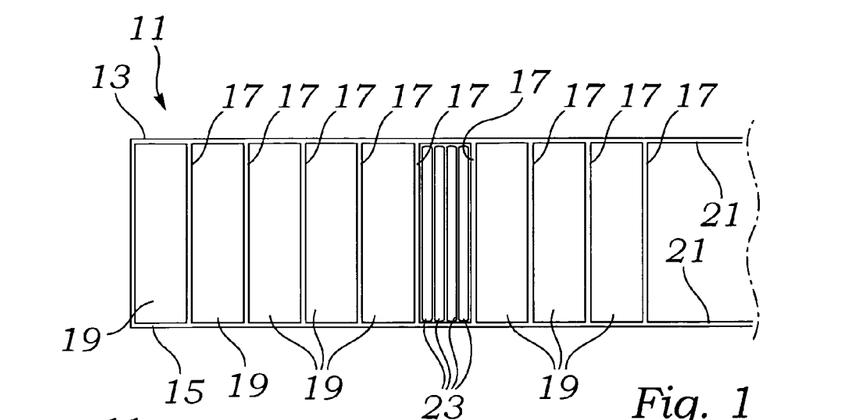
FIG. 1 illustrates a plan view looking directly into the individual cells of a cutting sleeve and illustrating a pair of base slat flange portions extending to the right as seen in FIG. 1.

In the alternative, a completely rectangular cutting sleeve 11 can be provided in any width, taken with respect to FIG. 1, with the user having the capability of cutting the first and second planar walls 13 and 15 just to the left of any wall 17 to turn the short lengths of the first and second planar walls 13 and 15 into optional slat accommodation flanges 21. This feature will serve the need for cutting optional length window covering horizontal slat sets which are typically provided to enable the user or seller to remove the ladder cords from the base slat, remove or remove the attachment of the lift cord to the base slat and then remove slats necessary to shorten the window covering horizontal slat set to the proper length. The base slat is then re-attached. Any chambers not 1005 filled can be filled with short lengths of slats which were removed during the shortening of the adjustable length window covering horizontal slat set (not shown).

The first and second planar walls 13 and 15, and the walls 17 have a real width which is both necessary to interrupt the effect of the horizontal ladder cord strings extending between the louvers 23, and as are necessary to provide firm support of the first and second planar walls 13 and 15 with respect to each other.

In the case of two inch wide louvers 23 of a width of about three millimeters and where groupings of slat 23 is about four per chamber 19, the wall thickness of the first and second planar walls 13 and 15, and the walls 17 is about two millimeters. The height of the chambers 19 for accommodating a two inch wide slat 23 is about 2.03 inches in order that the slat 23 groupings of four can be more easily inserted into the chambers 19. In this manner, the person loading the chambers 19 will not have to be unduly concerned that the slats 23 are completely aligned, beyond the alignment achievable manually.

The depth of the chambers 21 will be the depth of the cutting sleeve 11, and may be about two inches. In the cutting sleeve 11 shown in which nine chambers 21 are shown, along with the pair of base slat accommodation flanges 21, a set of chambers length from the leftmost wall 17 to the rightmost wall 17 dimension is about 175 millimeters. The distance which the pair of base slat accommodation flanges 21 extend beyond the rightmost wall 17 may be about twenty five millimeters.

Another popular size would be a cutting sleeve 11 which can be sized to accommodate one inch slats, or three, four or five inch wide slats. Further, as will be shown, there are embodiments which allow the walls 17 to be shortened and non-connected, or which are overly long (with the elimination of one of the first and second planar walls 13 and 15 to form a comb topology in which the walls can be made overlong.

Now it is understood that the slats 23 tend to spread slightly just beyond the confines of the chamber 19. The wall thickness of the walls 17 provide additional space beyond each set of four grouped slats 23 to "break up" the curved spreading into even packets, one per each of the chambers 19. As a result, any effects from having four closely grouped slats 23 will be slight and will not extend over the 36 slats which would otherwise be stacked in a clump. Such a 36 slat clump, if the user tried to compress it at the ends at one time, would create the most severe curvature for the end slats and thus (by the geometry of formation of the "S" curvature), cause them to have a shorter length within the total grouping to be cut. The result would be that the top and bottom slat 36 would be longer than slats 23 at the center of the stack whose ends were compressed into one restriction.

The width of the walls 17 are more than wide enough to accommodate the relatively thin thickness of the horizontal ladder cord connection members. Now with the dimensioning set forth in mind, it can be seen that it would be a relatively slight change for the cutting sleeve to have its nine chambers holding four slats 23 for a total of 36 slats, changed to six chambers 19 having six slats each. Further, nothing is to prevent chambers from being non-uniform to accommodate window covering horizontal slat sets having odd numbers of slats. The chambers 19 could be sized so that each adjacent chamber 19 has a width for differing numbers of louvers.

Using FIG. 1 as an example, the chambers 19 could be sized, instead of nine chambers with a width size sufficient for four slats each, to have alternating widths of four-three-four-three-four-three-four-three-four to accept twenty-nine slats 23. This same technique can be used to provide one or two abbreviated width chambers 19 necessary to produce a cutting sleeve 11 capable of handling odd numbers of slats 23.

This illustrates, for example, that if the cutting sleeve 11 of FIG. 1 were to be produced for use with thirty eight slats 23 (two over the thirty six slat 23 capacity seen in FIG. 1), it would not necessarily be required to add a whole chamber 19 of the standard four slat 23 width with instructions to stuff two lengths of scrap slat material into the last whole chamber 19 to get a tight fit. Two of the chambers could be sized to accept five slats 23. In the alternative, an additional chamber 19 could be added having a capacity of three slats 23 while one of the other nine chambers 19 could be sized to accept three slats 23.

In terms of materials, the cutting sleeve 11 could be advantageously injection molded or extruded. Where the cutting sleeve 11 is extruded, it can be formed with any depth of the chamber 19. A longer depth of cutting sleeve 11 can be provided for successive cutting and re-attachment to new window covering horizontal slat sets, especially at a retail store. It is expected that any cutting sleeve 11 attached to window covering horizontal slat sets to be packed and shipped will be of a width or chamber 19 depth sufficient to enable the window covering horizontal slat sets to be adequately cut during the customization cutting, either at the location of sale or at home.

Where the cutting sleeve 11 is designed to be cut in half and both halves discarded, it would be highly desirable to construct the cutting sleeve 11 of material which is as inexpensive as possible and which is preferably bio-degradable. Cellulose and homologous corn based materials can be molded to meet this need. Further, it may be preferable to supply enough of a cutting width, corresponding to the depth of chamber 19, to make two cuts, in case there is an error in the first cut where not enough material is taken.

Figure 2:
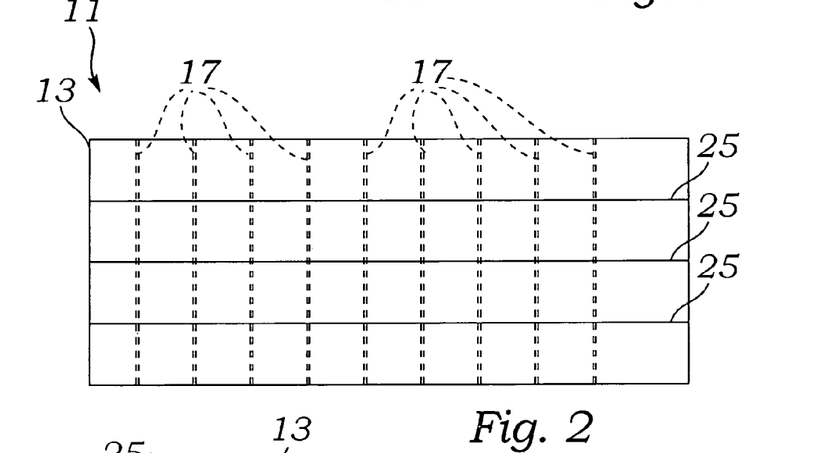
FIG. 2 is a top view of the cutting sleeve seen in FIG. 1 and illustrating some marking capabilities for the top and bottom surfaces of the cutting sleeve.

Referring to FIG. 2, a top view illustrates the walls 17 shown in dashed line format. On the top surface of the first planar wall 13 a series of optional cutting lines 25 are seen. The cutting lines 25 shown are three in number and divide the lateral cutting distances into fourths. Any number and spacing of cutting lines 25 can be utilized, as well as uneven lines or a scale. It is possible to state the dimensions between the cutting lines 23 and between the cutting lines 25 and the outer edge of the cutting sleeve 11. For example, where the width, corresponding to the depths of the chambers 19, is about two inches and where the cutting lines 25 are evenly spaced, there will be one half inch between the cutting lines.

Further, the view of FIG. 2 illustrates a top view, which is identical to the bottom view and the first planar wall 13 is shown as the top surface. However because the cutting sleeve 11 can be rotated one hundred eighty degrees, to give the same view as seen in FIG. 2, it is clear that an identical or different set of cutting lines 25 on the second planar wall 15 also. In the case where the cutting lines 25 are of different type, the window covering horizontal slat set (not shown) can be reversed in a cutting machine to see the other sides of the cutting sleeves 11, or they can be removed from the window covering horizontal slat set and reversed.

Figure 3:
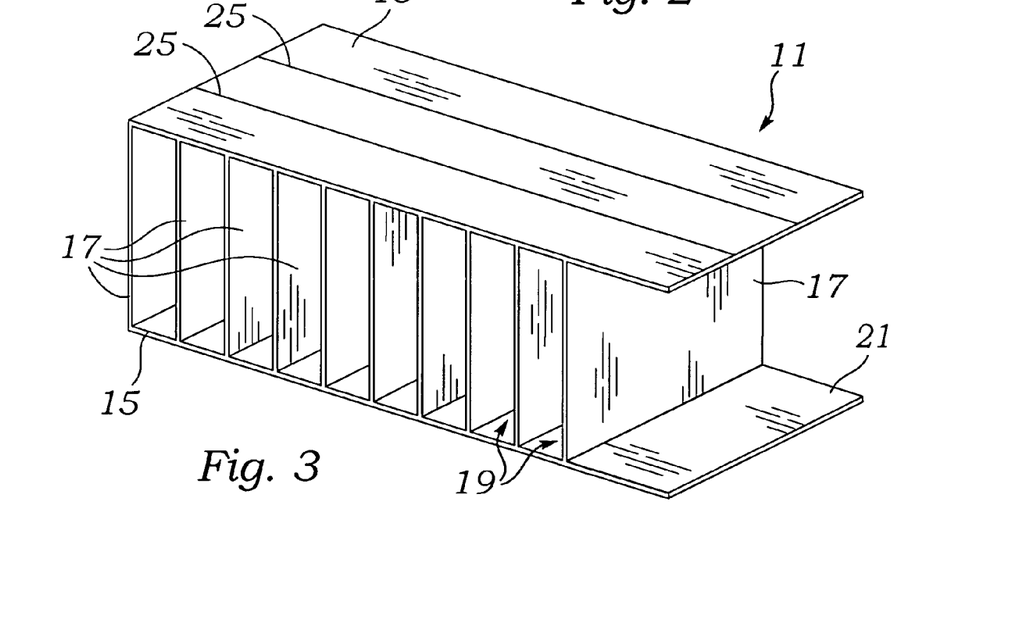
FIG. 3 is a perspective view of the cutting sleeve seen in FIGS. 1 and 2.

Referring to FIG. 3, a perspective view of the cutting sleeve seen in FIGS. 1 and 2 illustrates a more easily perceptible spatial view. As can be seen, the elimination of the extent of the first and second planar walls 13 and 15 extending beyond the rightmost wall 17 to eliminate the pair of base slat accommodation flanges 21 would yield a rectangular structure. Such elimination may be preferable, especially where a base slat is expected not to need significant rip protection. Further, where the cutting sleeve 11 is extruded, the elimination of the base slat accommodation flanges 21 might make cutting sleeve 11 easier to extrude.

Figure 4:
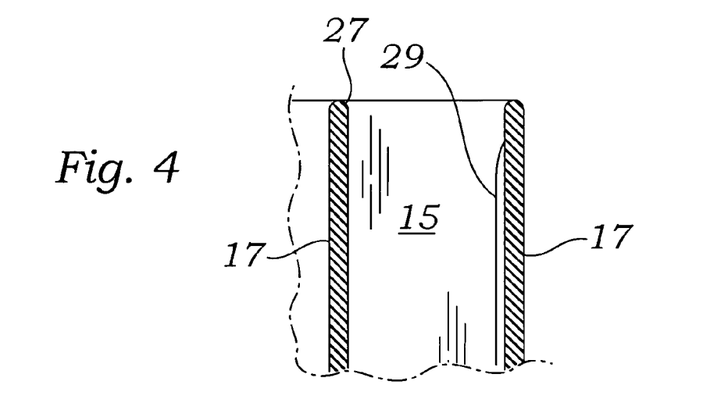
FIG. 4 is a closeup sectional view taken along lines 4-4 of FIG. 3 and illustrates the inclusion of a friction reducing rib supported by a wall.

Referring to FIG. 4, a sectional view looking down into the second planar wall 15 seen adjacent a pair of walls 17 shown in section, illustrates that the terminal edges of the material of the walls 17, and possibly the first and second planar walls 13 and 15, might terminate in a shape which assists admitting of the ends of slats 23 into the cutting sleeve 11. A rounded edge 27 is seen on the material of the walls 17, and second planar wall 15. In a mass production environment, the rounded edges 27 can be formed by momentary force contact with either a vibrating sanding template, or by pressing into a curved line form if the material is still warm, to forcibly shape it.

Also shown is an optional low height rib 29 extending from one of the walls 17. The use of a rib 29, particularly one which begins slightly inside the chambers 19, will not cause an obstruction to entry of the group of slats 23, but will help mitigate the area-friction effect as the slats 23 are fed into the chambers 19. When a close fit is achieved, entry of a group of slats 23 which have a main dimension of two inches, increase the frictional area by four square inches for each inch the slats 23 are advanced (two square inches per linear entry inch for each side). The use of ribs can provide additional holding pressure with reduced surface area contact. The ribs 29 need not be very high in order to reduce the friction effect mentioned.

Figures 5, 6:
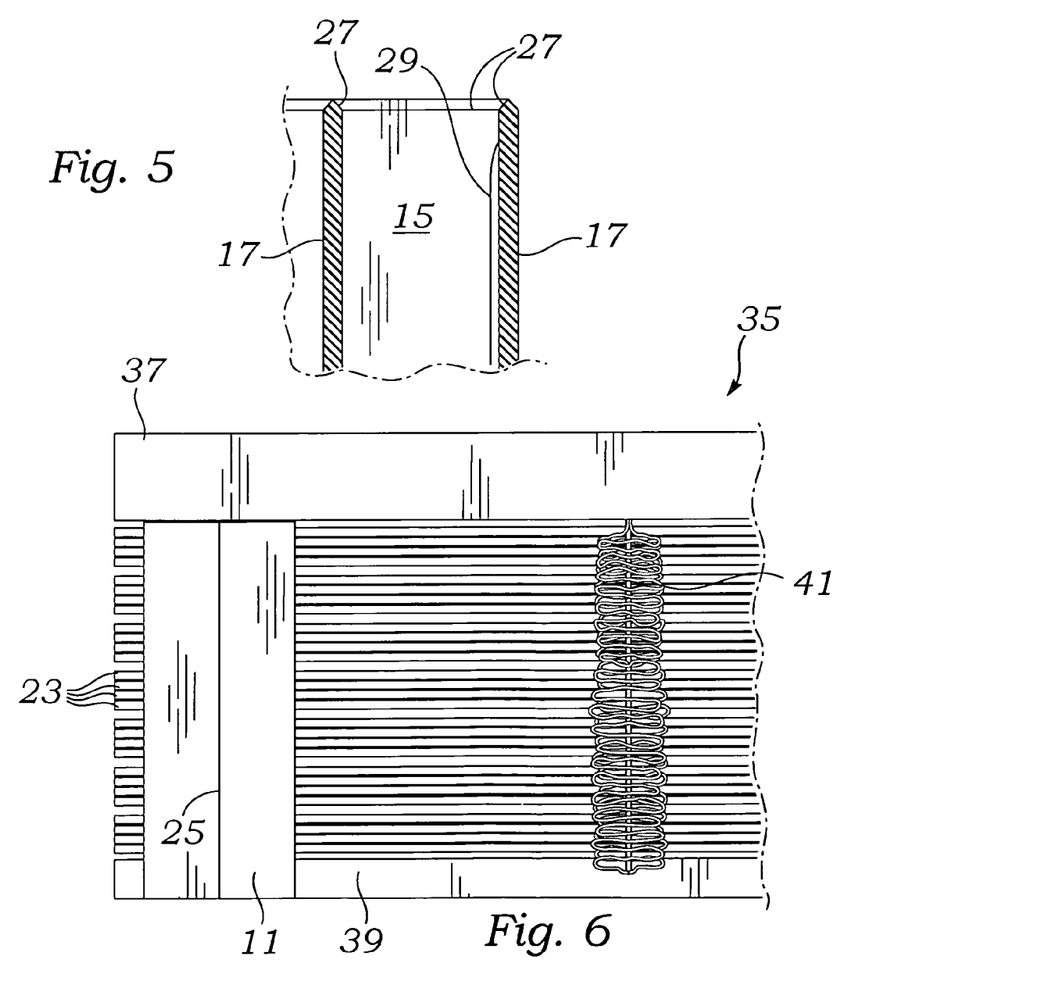
FIG. 5 is a closeup sectional view taken along lines 4-4 of FIG. 3 and illustrates the inclusion of angled or beveled entrance structures to facilitate manual loading of slats.
FIG. 6 is a plan view of the left side of a window covering horizontal slat set with the cutting sleeve of the invention fitted into place and shown in a position to begin cutting.

Referring to FIG. 5, a sectional view looking down into a second embodiment with respect to that shown in FIG. 4 illustrates a beveled arrangement. The second planar wall 15 and adjacent a pair of walls 17 have beveled surfaces 31. This is an added feature which can assist the user in gathering the slats 23 in groups and advancing each group slightly within the cutting sleeve 11 before collecting all of the groupings such that the cutting sleeve 11 can be advanced onto all of the grouped slats 23.

Other techniques may be utilized, such as wrapping each group of slats 23 in a re-usable tape or other collection structure before advancing the cutting sleeve 11. Because of the regularity of the production process, a machine can also be used to insert fingers into slats to group them together to enable cutting sleeve 11 to be more easily inserted, either manually or by machine.

Referring to FIG. 6, a view looking down onto a window covering horizontal slat set 35 is shown as having a cutting sleeve 11 in place. For convenience, only the left side of the window covering horizontal slat set 35 is shown, a second cutting sleeve 11 being located on the opposite end in a bilaterally symmetrical position. The window covering horizontal slat set 35 includes head rail 37, slats 23 which are grouped into groups of four by the cutting sleeve 11. As can be seen, the slats 23, as they emerge from the cutting sleeve 11 are initially in groups of four, but as they extend away from the cutting sleeve 11, begin to lose their grouped nature.

As a result, the cutting sleeve 11 can be seen to organize the slats 23 from the center of the window covering horizontal slat set 35 into parallel groupings of four. The cutting sleeve 11 can be seen as covering a base slat 39. To the right of the cutting sleeve 11 and just to the left of a jagged cutaway line a vertical ladder cord 41 is seen as being snaked about a section of the slats 23 through which a lift cord (not shown) will extend. From the snaked vertical ladder cord 41, a horizontal ladder cord (not seen) extends between each of the slats 23 tending to separate slats 23 and inhibit the tight overall grouping of the slats 23, especially immediately adjacent the vertical ladder cord 41. The view of FIG. 6 illustrates how effectively the cutting sleeve 11 can overcome the tendency of the horizontal ladder cords to separate the slats 23. The action of the cutting sleeve 11 can be seen as both (1) separating the slats 23 into groups of four, and (2) pressing the slats into a parallel position within each of the chambers 19. Because the slats 23 are forced into a parallel position they can be evenly cut. However, it should be noted that if the chambers 19 gather too many slats 23, the "S" shaped travel path into the cutting sleeve 11 of the most oppositely located slats 23 within the stack may cause them to be shorter within the cutting sleeve 11.

Figure 7:
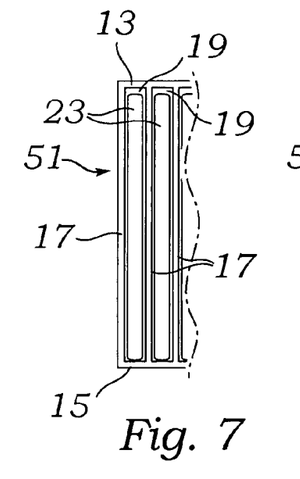
FIG. 7 is a further embodiment of the cutting sleeve of the invention having a plurality of channels sized to fit one slat per channel.

Just to illustrate that the cutting sleeve 11 can have any number and width of chambers 21, a series of optional examples are shown. Referring to FIG. 7, a cutting sleeve 51 is seen as having a series of individual chambers 19 with each chamber 19 containing one slat 23. The broken away view of FIG. 7 is for convenience as is the broken away portions of FIGS. 8-11. In practice, the cutting sleeve 51 would continue to the right with a repeating series of chambers 19. Likewise, and referring to FIG. 8, a cutting sleeve 53 is seen as having a series of individual chambers 19 with each chamber 19 containing two slats 23.

Figures 8, 9:
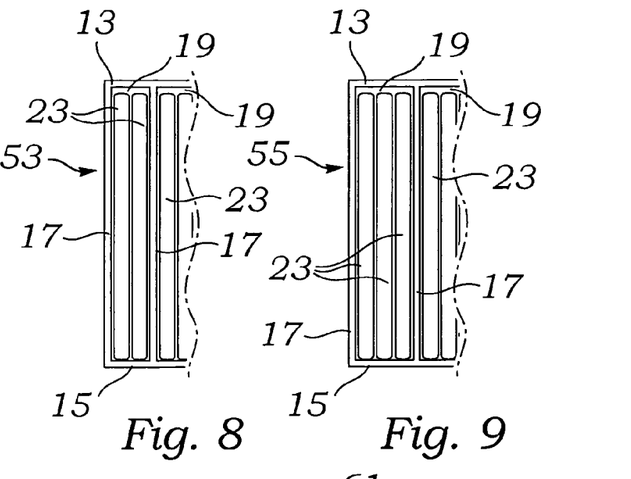
FIG. 8 is a further embodiment of the cutting sleeve of the invention having a plurality of channels sized to fit two slats per channel.
FIG. 9 is a further embodiment of the cutting sleeve of the invention having a plurality of channels sized to fit three slats per channel.
Figure 10:
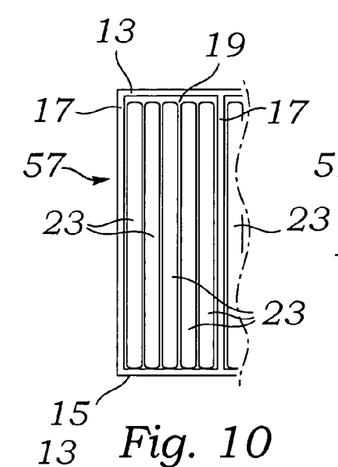
FIG. 10 is a further embodiment of the cutting sleeve of the invention having a plurality of channels sized to fit five slats per channel.
Figures 11, 12:
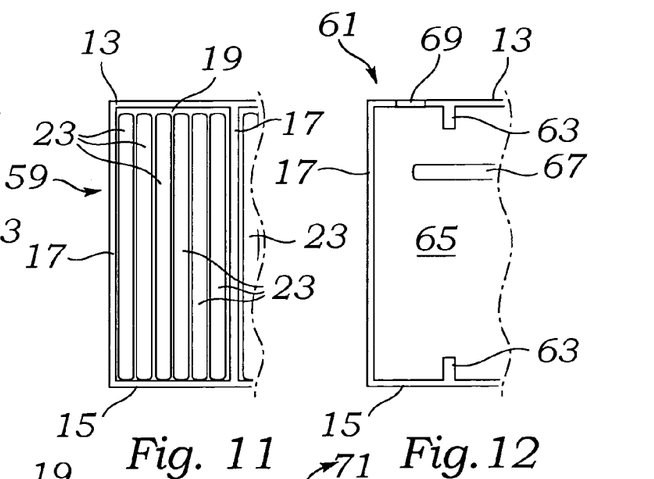
FIG. 11 is a further embodiment of the cutting sleeve of the invention having a plurality of channels sized to fit six slats per channel.
FIG. 12 is an isolation of an embodiment similar to that seen in FIG. 1, but illustrating options including an abbreviated slat grouping separation walls, an enclosing end wall and viewing slots in upper or lower planar walls and in such enclosing end wall.

Referring to FIG. 9, a cutting sleeve 55 is seen as having a series of individual chambers 19 with each chamber 19 containing three slats 23. Referring to FIG. 10, a cutting sleeve 57 is seen as having a series of individual chambers 19 with each chamber 19 containing five slats 23. Referring to FIG. 11, a cutting sleeve 59 is seen as having a series of individual chambers 19 with each chamber 19 containing six slats 23. Other possibilities contemplate cutting sleeves having chambers 19 of a width to contain groupings of seven or more slats 23. Further, slats 23 may be of any thickness or width and the chambers 19 of any of the cutting sleeves 11, 51, 53, 55, 57 or 59 will be adjusted to provide adequate compaction and linearization of the slats 23. Further, the thickness of either the walls 17 or the first and second planar walls 13 and 15 may also depend upon the material chosen for the construction of the cutting sleeves 11, 51, 53, 55, 57 or 59. Further, the need to specify the separation between the slats 23 may also dictate the material chosen for the construction of the cutting sleeves 11, 51, 53, 55, 57 or 59 in combination with the numbers of slats 23 to be supported.

Referring to FIG. 12 a variation is shown on cutting sleeve 11, as an example, as a cutting sleeve 61. Cutting sleeve 61 illustrates the use of abbreviated wall structures, such as abbreviated walls 63. The walls 63 are opposing, abbreviated, non-connecting, short and long enough that a corresponding set of slats 23 can be stably supported between each set of abbreviated walls 63.

Further, it is contemplated that in some instances the cutting sleeves 11, 51, 53, 55, 57, 59 or 61 may be made of thinner materials such that it would be helpful to provide additional structural support. A wall 65 is seen as extending between the end wall 17, first planar wall 13, and second planar wall 15. This structural addition essentially forms an end cap to the cutting sleeves 11, 51, 53, 55, 57, 59 or 61. This end cap will only partially limit the positioning of the cutting lines 25. As shown in FIGS. 1-6, the cutting line 25 can be positioned by measuring from the sides of the cutting sleeves 11, 51, 53, 55, 57, 59 or 61 from either side. In FIG. 6 it is noted that the extending of the ends of the slats 23 outside one end of the cutting sleeve 11 enables a user to measure distance to be cut by measuring from the ends of the slats 23 to the cutting line 25.

If a wall 65 is applied over the ends of the channels 19 to essentially form an end wall, the lengths of the channels 19 will be expected to be more than two or three inches, long enough that the cutting line can be properly positioned. In FIG. 6, it may be preferable to provide a cutting sleeve 11 which is three to four times as wide to insure that the cutting sleeve 11, or cutting sleeves 11, 51, 53, 55, 57, 59 or 61 can be moved outward to position the cutting line 25.

Further, the use of a close ended cutting sleeves 11, 51, 53, 55, 57, 59 or 61 will provide additional protection when shipped. Where the provision of an additional wall 65 will add additional structural integrity, it will also reduce the ability to see the positioning of the ends of the slats 23 with respect to the cutting lines 25. To mitigate this effect, and to give the user the ability to more rapidly assess the distance of the cutting line or lines 25 from the ends of the slats 23, one or more slots may be employed. A slot 67 is shown as existing within wall 65. A slot 69 is seen within the first planar wall 13. Slot 67 helps the user to see the existence and uniformity of the slats 23 when the cutting sleeves 11, 51, 53, 55, 57, 59 or 61 are fit completely onto the slats 23, such as initial loading or attachment of the cutting sleeves 11, 51, 53, 55, 57, 59 or 61 before shipping.

At the time of cutting, when the cutting sleeves 11, 51, 53, 55, 57, 59 or 61 are backed off to move the cutting line 25 a given distance from the ends of the slats 23, the slot 69 enables a good visual verification of the distance from the ends of the slats 23 to the cutting line 23. The use of cutting sleeves 11, 51, 53, 55, 57, 59 or 61 with the wall 65 is helped by insuring that the slats are aligned. The use of a much wider cutting sleeve 11, 51, 53, 55, 57, 59 or 61 might also be combined with the use of a single cutting sleeve designed to be used twice. Such a sleeve could be mounted on one side of the window covering horizontal slat set, while the opposite side is aligned. The window covering horizontal slat set 35 has its much wider cutting sleeve 11, 51, 53, 55, 57, 59 or 61 withdrawn to a first cutting line 25, and then cutting operation occurs, with the remaining portion of the much wider cutting sleeve 11, 51, 53, 55, 57, 59 or 61 containing the wall 65 emptied of any slat 23 portions and fitted onto the other end. It is more preferable to be able to visually inspect to slats 23 to insure that they are even and aligned when cut, but the embodiment of FIG. 12 is propounded to illustrate (1) that additional structural elements can be had, (2) the structural elements can be abbreviated, shortened or disconnected, and (3) that visual windows and openings can be added.

It may be preferable to provide the much wider cutting sleeve 11, 51, 53, 55, 57, 59 or 61 with a clear or semi-clear material so that any additional obstructions or structural reinforcements will not unduly prevent adequate visual inspection.

Another example of eliminating and changing the character of structures is seen in a cutting sleeve 71 which, compared to the view of FIG. 1 has common structures and can be explained more adequately with respect to FIGS. 1-3. There are two or three possible changes. The first planar wall 13 may be made thicker to give better support of the walls 17. The second planar wall 15 is removed to make the four sided channels 19 seen in FIGS. 1-3 into three sided channels 19 open at their bottom end. The walls 17 may have angled edges 73 to facilitate the loading of the cutting sleeve 71 onto slats 23 laterally utilizing the angled edges 73. In the alternative, the walls 71 can be urged between the slats 23 at the facing edges which can be seen looking into the view of FIG. 13.

The orientation of the cutting sleeve 71 takes advantage of the fact that many window covering horizontal slat set 35 are cut on a table which is well supported from the bottom. As a result of such support, and in view of the even level of the underside surface of the first planar wall 13, a window covering horizontal slat set 35 which is oriented for cutting as seen in FIG. 6, can have the cutting sleeve 71 quickly inserted by downward motion to achieve the same view seen in FIG. 6. The cutting sleeve 11 seen in FIG. 6 would appear exactly like the cutting sleeve 71 seen in FIG. 13.

Figure 13:
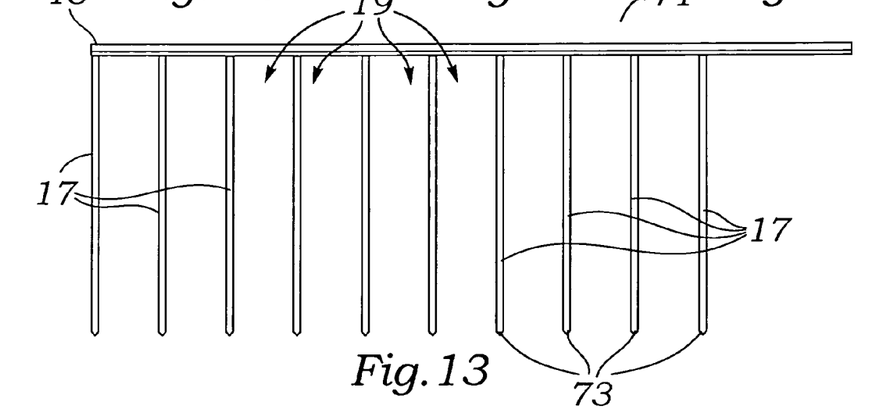
FIG. 13 is a view, similar to that seen in FIG. 1, with the second planar wall removed, to form a comb shaped structure which facilitates loading onto and forming groupings of slats from the side edge of the slat rather than the end of the slat.

For cutting sleeve 71, the lateral forces of collecting and holding the slats 23 would have to be borne solely by the connection between the walls 17 and the first planar wall 13. The other advantage of the cutting sleeve 71 is that the length of the walls 17 would not be strictly limited by the width of the slats 23. Where the cutting table provided no under support for the slats 23 at the area of cutting, satisfactory results could still be obtained even if the walls 17 did not extend beyond the width of the slats. Ripping could occur if the walls 17 fell short, but the design of cutting sleeve 71 is such that the walls 17 could be four or five inches in distance extending from the first planar wall 13, and thus extend significantly beyond the extend of the slats.

Therefore, a cutting sleeve 71 with long walls 17 could be utilized in two ways. First, if the vertical table supporting the window covering horizontal slat set 35 does not extend to a point near the area of cutting, say with respect to FIG. 6 all the way to the extent of the beginning of the cutting sleeve 11 seen in FIG. 6, then cutting sleeve 71 can be used with walls 17 extending downwardly even beyond the slats 23 (which are generally initially supported by the bulk extent of the window covering horizontal slat set 35.

Where an underlying table is present, the cutting sleeve 71 can be inserted from the bottom with the over dimension length of the walls 17 extending upward, and with cutting proceeding in the usual way. For installation of the cutting sleeve 71, particularly if the angled edges 73 are present, the user need only rack the slats together and, while angling the cutting sleeve 71 slightly, begin to finger the walls 17 into the appropriately sized groupings for which the cutting sleeve 71 is set. Where a user has some manual dexterity buildup from using the cutting sleeve 71 a few times, it may be possible to load the cutting sleeve 71 onto the slat 23 groupings very quickly, in perhaps a second or two. The width of the walls 17, and the effective depth of the channels 19 can be greater or lesser than the corresponding extent of the first planar wall 13. The top of the first planar wall 13 can also be shaped for stability and alignment of the saw in cutting along the proper line.

While the present invention has been described in terms of a system and method for forming stable groupings of slats of various construction for the purpose of stably cutting them, and especially if the cutting sleeve is cut along with the slats, one skilled in the art will realize that the structure and techniques of the present invention can be applied to many structures, including any structure or technique where balanced joinder of collected materials in which both sides continue to be supported during cutting.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A cutting sleeve and slat combination for facilitating the precise cutting of slats in a window covering comprising a housing having a plurality of linear slat grouping channels for collecting groups of slats closely together, said collected groups separated only by a thickness of a single layer of material separating said slat grouping channels from each other, to facilitate grouping and close support of said collected groups of slats for even cutting; and     a plurality of slats, such as associated with a window covering, having groups of said plurality of slats carried within said slat grouping channels of said cutting sleeve to facilitate simultaneous cutting of said slats and said cutting sleeve.

2. The cutting sleeve and slat combination for a window covering as recited in claim 1 wherein said plurality of channels are in communication with each other.

3. The cutting sleeve and slat combination for a window covering as recited in claim 1 wherein said plurality of channels have three open sides and three structurally supported sides.

4. The cutting sleeve and slat combination for a window covering as recited in claim 1 wherein said plurality of channels have channel openings having edges which are shaped to facilitate the admission of slats into said plurality of channels.

5. The cutting sleeve and slat combination for a window covering as recited in claim 4 wherein said shape of said channel openings have edges which are curved in a position of at least one entrance to the channel openings.

6. The cutting sleeve and slat combination for a window covering as recited in claim 4 wherein said shape of said channel openings are beveled.

7. The cutting sleeve and slat combination for a window covering as recited in claim 1 wherein said housing includes a first wall opposite a second wall with said plurality of slat grouping channels extending between said first and said second walls.

8. The cutting sleeve and slat combination for a window covering as recited in claim 7 wherein said housing includes at least a first connecting wall extending between said first and said second walls.

9. The cutting sleeve and slat combination for a window covering as recited in claim 8 wherein said connecting wall forms a part of at least one of said plurality of channels.

10. The cutting sleeve and slat combination for a window covering as recited in claim 7 wherein both sides of said first wall, each opposite an associated one of each of both sides of said second wall extend beyond said plurality of slat grouping channels for engaging and stabilizing both said base slat and said head rail.

11. The cutting sleeve and slat combination for a window covering as recited in claim 1 wherein said housing includes a first wall and a plurality of walls extending away from said first wall to form said plurality of slat grouping channels.

12. The cutting sleeve and slat combination for a window covering as recited in claim 11 wherein said plurality of walls extending away from said first wall end in an angled edge.

13. The cutting sleeve and slat combination for a window covering as recited in claim 1 wherein said plurality of slat grouping channels are sized to accept from one to about six slats.

14. The cutting sleeve and slat combination for a window covering as recited in claim 1 wherein said plurality of slat grouping channels have adjacent walls of about two millimeters in thickness in order to minimize the spread of spacing between adjacent slat grouping channels.

15. The cutting sleeve and slat combination for a window covering as recited in claim 1 wherein said slat grouping channels are rectangular.

16. The cutting sleeve and slat combination for a window covering as recited in claim 15 wherein said slat grouping channels have two open sides and four structurally supported sides.

17. The cutting sleeve and slat combination for a window covering as recited in claim 1 wherein a length of said cutting sleeve in the direction of said plurality of slat grouping channels is about two inches.

18. The cutting sleeve and slat combination for a window covering as recited in claim 1 which is formed of material from the group consisting of at least one of plastic, polyurethane, polyvinyl chloride, nylon, fiber glass, wood, glass, carbon composite, polypropylene, Teflon, shrink wrap, elastic, paper, cardboard, and metal.

19. A cutting sleeve for facilitating the precise cutting of slats in a window covering comprising a housing having a plurality of linear slat grouping channels for collecting groups of slats closely together to facilitate grouping and close support of said collected groups of slats for even cutting; wherein said housing includes a first wall opposite a second wall with said plurality of slat grouping channels extending between said first and said second walls; and     wherein at least one side of said first wall opposite at least one side of said second wall and wherein at least one side of said second wall extends opposite said at least one side of said first wall, both extend beyond said plurality of slat grouping channels for engaging and stabilizing at least one of a base slat and a head rail to provide stability of at least one of a base slat and a head rail during cutting.

20. The process of utilizing a cutting sleeve and slat combination for facilitating the precise cutting of slats in a window covering comprising the steps of:

providing a cutting sleeve housing having a plurality of linear slat grouping channels for collecting groups of slats closely together, to facilitate grouping and close support of said collected groups of slats for even cutting;

providing a plurality of slats, such as associated with a window covering;

slidably engaging said cutting sleeve over groups of said plurality of slats such that said groups are carried within said slat grouping channels to facilitate an even cutting of said slats.

21. The process of utilizing a cutting sleeve and slat combination as recited in claim 20, and wherein said even cutting of said slats includes simultaneous cutting of said slats and said cutting sleeve.

* * * * *